United States Patent [19]

Nakata

[11] Patent Number: 5,715,682
[45] Date of Patent: Feb. 10, 1998

[54] COMBINED-CYCLE POWER GENERATION SYSTEM USING WASTE MATTER AS FUEL

[75] Inventor: Nobuo Nakata, Tokyo, Japan

[73] Assignee: Ebara Corporation, Tokyo, Japan

[21] Appl. No.: 787,917

[22] Filed: Jan. 23, 1997

[30] Foreign Application Priority Data

Jan. 24, 1996 [JP] Japan ................... 8-031412

[51] Int. Cl.$^6$ .................................................. F01K 23/04
[52] U.S. Cl. .................................................. 60/655; 60/649
[58] Field of Search ........................... 60/649, 655, 673, 60/682

[56] References Cited

FOREIGN PATENT DOCUMENTS 86 05234  9/1986  WIPO .

OTHER PUBLICATIONS

BWK Brennstoff Warme Kraft, vol. 43, No. 7/08, Jul. 1, 1991, pp.353–356. XP000226859, Schmidt, L.et al: "Thermodynamische Untersuchungen Zum Wirkungsgrad Eines Geschlossenen Gasturbinen–Und Dampfturbineprozesses".
Variuos: "Proceedings of the 27th Intersociety Energy Conversion Engineering Conference", Dec. 9, 1992, Society of Automotive Engineers, San Diego 1992, XP000392711193460, Installation and early test results of a 3MW Kalina Cycle Demonstration Plant * pp.3.35–3.42.
"Power", Sep./Oct. 1996, pp.6 and 10.
Trans. Same, Journal of Engineering for Gas Turbine and Power, vol. 118, No. 3, Jul. 1996 pp. 604–609.
ASME IGTI (Am. Soc. Mech. Eng. Int. Gas Turbine Inst.) vol. 9, 1994, pp.663–671.
ASME IGTI (Am. Soc. Mech. Eng. Int. Gas Turbine Inst.) vol. 9, 1994, pp. 631–640,
Industrial Bureau of Gunma–Prefecture, "Takahama Generator Plant" (brochure), and a partial translation thereof.
Ebara Corp. "Creation of Energy" (catalogue), 1995, pp. 19 and 20.
Ebara Corp. "Creation of Energy" (catalogue), 1995, pp. 21 and 22.
Ebara Corp. "Creation of Energy" (catalogue), 1995, pp. 23 and 24.

*Primary Examiner*—Noah P. Kamen
*Attorney, Agent, or Firm*—Wenderoth, Lind & Ponack

[57] ABSTRACT

A combined-cycle power generation system using waste matter as a fuel, which can be expected to improve in power generation efficiency without using an additional fuel. The system has a corrosive exhaust gas source (waste exhaust gas source) (1), a closed-cycle gas turbine (2), and a Kalina-cycle steam turbine (3). A ceramic heat exchanger (6) for the closed-cycle gas turbine (2) is disposed on a high-temperature side of the corrosive exhaust gas source (1). A heat exchanger (7) heats a mixed ammonia water fluid (11) for the Kalina-cycle steam turbine (3) by a high-temperature side exhaust gas from the closed-cycle gas turbine. A heat exchanger (9) evaporates a condensate of the mixed ammonia-water fluid (11) by heat remaining in the exhaust gas from the closed-cycle gas turbine. A heat exchanger (10) for the Kalina-cycle steam turbine is disposed on a low-temperature side of the corrosive exhaust gas source (1) to evaporate the mixed ammonia-water fluid (11) by heat remaining in the waste exhaust gas.

3 Claims, 1 Drawing Sheet

COMBINED-CYCLE POWER GENERATION SYSTEM USING WASTE MATTER AS FUEL
(PRESSURES ARE EXPRESSED AS ABSOLUTE PRESSURES)

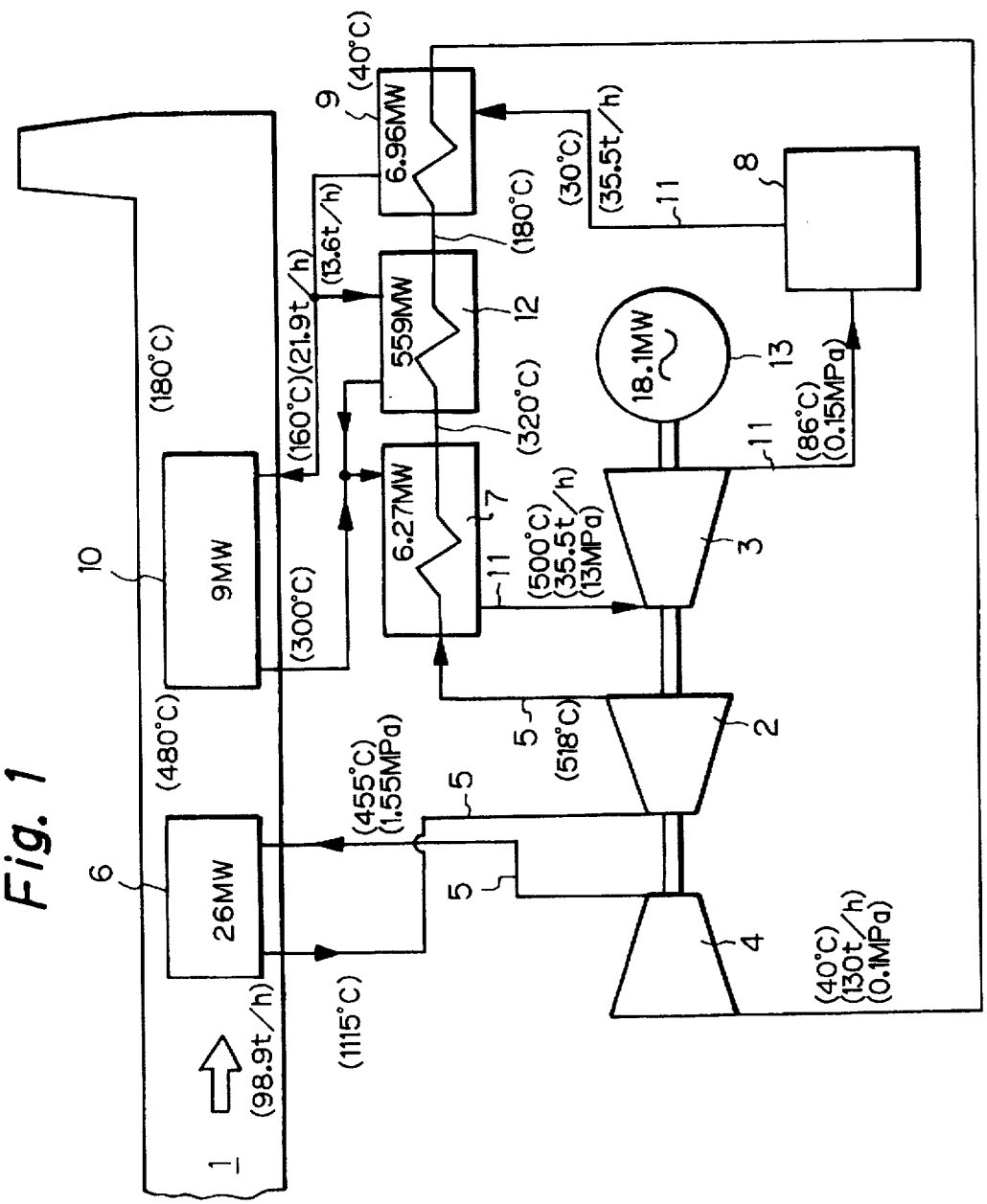

COMBINED-CYCLE POWER GENERATION SYSTEM USING WASTE MATTER AS FUEL

BACKGROUND OF THE INVENTION

The present invention relates to a combined-cycle power generation system using waste matter as a fuel to recover power from a high-temperature corrosive combustion gas through a heat exchanger (boiler), a gas turbine, and a steam turbine.

Instead of the Rankine cycle power generation system, which uses water-steam, the Kalina-cycle, which uses a mixed ammonia-water fluid, is expected to contribute to improvement in the efficiency of power generation systems. It is said that the use of a Kalina-cycle as a bottoming cycle of an open-cycle gas turbine enables the output of the steam turbine to exceed the output of a reheating Rankine-cycle steam turbine by 25%. Consequently, it is expected that the generator-end efficiency (in terms of low heat value) of utility gas turbine combined-cycle power generation fueled by natural gas will reach 60%.

In contrast, power generation using waste matter as a fuel generates a corrosive combustion gas. In Japan, therefore, the temperature of waste heat recovery steam is controlled to as low a level as 300° C. There is a method wherein an open-cycle gas turbine fueled by natural gas or the like is installed together with a waste incinerator, and waste heat recovery steam from the incinerator is reheated by clean exhaust gas from the gas turbine. This method improves the efficiency of Rankine and Kalina-cycles.

However, the above-described method requires an additional fuel, e.g. natural gas, in addition to waste matter. Further, the method wherein heat recovery steam is heated to high temperature and pressurized to high level needs to periodically replace heating pipes according to the degree of corrosion. Therefore, it is necessary to accurately predict the timing for replacement. Moreover, the replacement requires a certain number of days. This reduces the operating time for power generation and waste disposal.

SUMMARY OF THE INVENTION

In view of the above-described circumstances, an object of the present invention is to provide a combined-cycle power generation system using waste matter as a fuel, which can be expected to improve in power generation efficiency without using an additional fuel, e.g. natural gas.

To attain the above-described object, the present invention provides a combined-cycle power generation system using waste matter as a fuel, which includes a waste exhaust gas source, a closed-cycle gas turbine, and a Kalina-cycle steam turbine. An externally-heated heat exchanger for the closed-cycle gas turbine is disposed on a high-temperature side of the waste exhaust gas source. The combined-cycle power generation system further includes a heat exchanger for heating a mixed ammonia-water fluid for the Kalina-cycle steam turbine by a high-temperature side exhaust gas from the closed-cycle gas turbine, and a heat exchanger for evaporating a condensate of the mixed ammonia-water fluid by heat remaining in the exhaust gas from the closed-cycle gas turbine. In addition, an externally-heated heat exchanger for the Kalina-cycle steam turbine is disposed on a low-temperature side of the waste exhaust gas source to evaporate the mixed ammonia-water fluid by heat remaining in the waste exhaust gas.

The externally-heated heat exchanger for the closed-cycle gas turbine may be a ceramic heat exchanger.

According to another aspect of the present invention, there is provided a combined-cycle power generation system using waste matter as a fuel, which includes a waste exhaust gas source; a ceramic heat exchanger disposed on a high-temperature side of the waste exhaust gas source; a carbon steel heat exchanger disposed on a low-temperature side of the waste exhaust gas source; a closed-cycle gas turbine; a Kalina-cycle steam turbine; a first heat exchanger; a second heat exchanger disposed downstream the first heat exchanger; and a third heat exchanger disposed between the first heat exchanger and the second heat exchanger. A working fluid for the closed-cycle gas turbine is pressurized in a compressor for the closed-cycle gas turbine and introduced into the ceramic heat exchanger where it is heated, and the heated working fluid is expanded through the closed-cycle gas turbine to obtain power. The working fluid discharged from the closed-cycle gas turbine is passed successively through the first heat exchanger, the third heat exchanger, and the second heat exchanger and introduced into the compressor. A mixed ammonia-water fluid, which is a working fluid for the Kalina-cycle steam turbine, is heated in the first heat exchanger, and the heated mixed ammonia-water fluid is expanded through the Kalina-cycle steam turbine to obtain power. The mixed ammonia-water fluid is distilled, cooled and condensed in a Kalina-cycle distillation and condensation system for adjusting a concentration of the mixed ammonia-water fluid, and the mixed ammonia-water fluid thus distilled, cooled and condensed is introduced into the second heat exchanger where it is heated by heat retaining in the working fluid for the closed-cycle gas turbine. A part of the heated mixed ammonia-water fluid is introduced into the carbon steel heat exchanger where it is heated to within an allowable temperature for carbon steel relative to the corrosive gas, while the remaining mixed ammonia-water fluid is introduced into the third heat exchanger where it is heated, and the heated mixed ammonia-water fluid is joined with the mixed ammonia-water fluid heated in the carbon steel heat exchanger and introduced together into the first heat exchanger.

Other objects and advantages of the present invention will become apparent from the following detailed description of illustrated embodiments of the invention.

BRIEF DESCRIPTION OF THE DRAWING

The attached sole FIG. 1 shows the arrangement of a combined-cycle power generation system using waste matter a fuel according to the present invention.

DETAILED DESCRIPTION OF THE PREFERRED EMBODIMENTS

An embodiment of the present invention will be described below in detail with reference to the accompanying drawing. FIG. 1 shows the arrangement of a combined-cycle power generation system using waste matter as a fuel according to the present invention. The combined-cycle power generation system according to the present invention has a waste heat recovery system. The waste heat recovery system consists essentially of a high-temperature corrosive exhaust gas source (waste exhaust gas source) 1 supplied from a waste incinerator or the like, a closed-cycle gas turbine 2, a mixed ammonia-water fluid steam turbine 3, and a generator 13. The combined-cycle power generation system further has a ceramic heat exchanger 6 and a heat exchanger 10, which are disposed in the corrosive exhaust gas source 1. Moreover, the combined-cycle power generation system has a first heat exchanger 7, a third heat exchanger 12, a second heat exchanger 9, and a Kalina-cycle distillation and condensation system 8. It should be noted that the heat exchanger 10 is made of a carbon steel material.

A working fluid 5 pressurized in a compressor 4 for the closed-cycle gas turbine 2 is heated in the ceramic heat exchanger 6, which is disposed on the high-temperature side of the corrosive exhaust gas source 1. The heated working fluid 5 is expanded through the closed-cycle gas turbine 2 to obtain power. The working fluid 5 coming out of the closed-cycle gas turbine 2 passes successively through the first heat exchanger 7, the third heat exchanger 12, and the second heat exchanger 9 to return to the compressor 4.

The first heat exchanger 7 is installed on the exhaust high-temperature side of the closed-cycle gas turbine 2 to heat a mixed ammonia-water fluid 11 by the working fluid 5 from the closed-cycle gas turbine 2. The mixed ammonia-water fluid 11 heated in the first heat exchanger 7 is expanded through the mixed ammonia-water fluid steam turbine 3 to obtain power. Moreover, the mixed ammonia-water fluid 11 is distilled, cooled and condensed in the Kalina-cycle distillation and condensation system 8, which adjusts the concentration of the mixed ammonia-water fluid 11. The mixed ammonia-water fluid 11 distilled, cooled and condensed in the distillation and condensation system 8 is heated by heat remaining in the working fluid 5 in the second heat exchanger 9, which is disposed on the downstream side (low-temperature side) of the first and third heat exchangers 7 and 12.

A part of the mixed ammonia-water fluid 11 thus heated is introduced into the heat exchanger 10, which is made of a carbon steel and disposed on the downstream side (low-temperature side) of the ceramic heat exchanger 6 in the corrosive exhaust gas source 1. The mixed ammonia-water fluid 11 introduced into the heat exchanger 10 is heated by heat remaining in the corrosive exhaust gas source 1 to within an allowable steam temperature for carbon steel relative to the corrosive gas. The remaining mixed ammonia-water fluid 11 is heated in the third heat exchanger 12, which is disposed between the first heat exchanger 7 and the second heat exchanger 9. The mixed ammonia-water fluid 11 heated in the third heat exchanger 12 and the mixed ammonia-water fluid 11 heated in the heat exchanger 10 join each other and are introduced into the first heat exchanger 7.

In the combined-cycle power generation system, the corrosive exhaust gas source 1 is a high-temperature exhaust gas from a waste incinerator. The temperature of the exhaust gas depends on the excess air ratio for combustion in the waste incinerator; it is in the range of from 900° C. to 1350° C. Let us assume that an exhaust gas flow rate of 98.9 t/h and an exhaust gas temperature of 1350° C. are given for a waste incinerator having a daily incineration capacity of 300 t.

Assuming that the inlet air flow rate in the closed-cycle gas turbine 2 is 130 t/h, and the inlet temperature is 1115° C., and that the inlet pressure is 1.55 MPa.abs, and the exhaust pressure is 0.11 MPa.abs, a power of 24.4 MW is recovered.

Assuming that the inlet pressure in the mixed ammonia-water fluid steam turbine 3 is 13.0 MPa.abs, and the inlet temperature is 500° C., and that the mixture ratio of the mixed ammonia-water fluid 11 is ammonia 70% to water 30%, and the flow rate of the mixed ammonia-water fluid 11 is 35.5 t/h, and further that the turbine adiabatic efficiency is 86%, the outlet pressure is 0.15 MPa.abs, and the outlet temperature is 86° C. The recovered power is 9.1 MW.

The compressor 4 is provided for the closed-cycle gas turbine 2. Assuming that an axial flow compressor which is the same as used for an open-cycle gas turbine having an air flow rate of about 130 t/h is used as the compressor 4, and that the inlet pressure in the compressor 4 is 0.1 MPa.abs and the inlet temperature is 40° C., the outlet pressure is 1.55 MPa.abs, the outlet temperature is 463° C., and the required power is 15.0 MW. As the working fluid 5 for the closed-cycle gas turbine 2, clean dehumidified air is used.

The ceramic heat exchanger 6 heats the working fluid 5 for the closed-cycle gas turbine 2 from 455° C. to 1115° C. The ceramic heat exchanger 6 is a shell and tube heat exchanger made of a silicon nitride ceramic material. It is preferable to provide a soot blower on the waste exhaust gas side of the ceramic heat exchanger 6 to thereby clean the tube surface.

The first heat exchanger 7, which is installed on the exhaust high-temperature side of the closed-cycle gas turbine 2, is supplied with the mixed ammonia-water fluid 11 at a flow rate of 21.9 t/h, which has been heated to 300° C. to evaporate by the waste exhaust gas in the heat exchanger 10, and also supplied with the mixed ammonia-water fluid 11 at a flow rate of 13.6 t/h, which has been heated to a temperature of 300° C. in the third heat exchanger 12 disposed downstream the first heat exchanger 7. The first heat exchanger 7 heats the mixed ammonia-water fluid 11 thus supplied at a total flow rate of 35.5 t/h to 500° C. by the exhaust gas of temperature 518° C. discharged from the closed-cycle gas turbine 2. The first heat exchanger 7 is a serrated fin-tube heat exchanger as used in an exhaust gas boiler for an open-cycle gas turbine.

The Kalina-cycle distillation and condensation system 8 cools, condenses and heat-dissipates the mixed ammonia-water fluid 11 discharged from the mixed ammonia-water fluid steam turbine 3. The second heat exchanger 9 is a heat exchanger in which the mixed ammonia-water fluid 11 condensed in the Kalina-cycle distillation and condensation system 8 is heated to evaporate by the exhaust gas (temperature: 180° C.) from the closed-cycle gas turbine 2. A serrated fin-tube heat exchanger is used as the second heat exchanger 9 as in the case of the first heat exchanger 7. In the second heat exchanger 9, the mixed ammonia-water fluid 11 of temperature 30° C. is heated to 160° C. and thus evaporated. On the other hand, the exhaust gas from the closed-cycle gas turbine 2 is cooled to a temperature of 40° C.

The heat exchanger 10, which is installed on the low-temperature side of the corrosive exhaust gas source 1, heats the mixed ammonia-water fluid 11, which is supplied at a flow rate of 21.9 t/h, from 160° C. to 300° C., thereby evaporating the mixed ammonia-water fluid 11. The heat exchanger 10 is a bare tube heat exchanger made of a carbon steel used for waste boilers. To avoid high-temperature corrosion of the carbon steel by the waste exhaust gas, it is preferable to effect temperature control by a desuperheater such that the outlet temperature of the mixed ammonia-water fluid 11 in the heat exchanger 10 is not higher than 300° C.

The third heat exchanger 12 heats a part of the mixed ammonia-water fluid 11 of temperature 160° C. coming out of the second heat exchanger 9 (flow rate: 13.6 t/h) to 300° C. A serrated fin-tube heat exchanger is used as the third heat exchanger 12 as in the case of the first heat exchanger 7 and the second heat exchanger 9.

The power recovered by the above-described combined-cycle power generation system is the sum of the power recovered by the closed-cycle gas turbine 2 and the power recovered by the mixed ammonia-water fluid steam turbine 3 minus the power consumed by the compressor 4, that is, 18.7 MW. Assuming that the sum total of the reduction gear loss between the closed-cycle gas turbine 2, the mixed ammonia-water fluid steam turbine 3, and the generator 13 and the generator loss is 3% of the recovered power, the generator-end output of the generator 13 is 18.1 MW.

If the waste exhaust gas supplied at a flow rate of 98.9 t/h is subjected to waste heat recovery until the temperature of the exhaust gas lowers from 1350° C. to 180° C. as described above, the quantity of heat recovered is 35 MW. The combined thermal efficiency, which is the ratio of the generator-end output 18.1 MW to the recovered heat quantity, is 51.7%. Thus, it is possible to obtain a high generator-end efficiency that is in no way inferior to the generator-end efficiency of a combined-cycle power generation system having a natural gas-fueled open-cycle gas turbine in the 20 MW class and a Kalina-cycle.

Although in the foregoing embodiment clean dehumidified air is used as a working fluid for the closed-cycle gas turbine 2, it should be noted that the working fluid for the closed-cycle gas turbine 2 is not necessarily limited to clean dehumidified air, and that other gases, for example, nitrogen gas, may also be used as a working fluid.

The above-described combined-cycle power generation system using waste matter as a fuel according to the present invention provides the following advantageous effects:

(1) A combined-cycle power generation system is constructed such that power is recovered from a high-temperature combustion gas for waste power generation by a gas turbine cycle, and power is recovered from the gas turbine exhaust gas and the low-temperature combustion gas by Kalina-cycle. Thus, it is possible to expect a substantial output increase in comparison to the conventional steam turbine systems. For example, assuming that the output of a conventional steam turbine system having a steam temperature of 300° C is 10.5 MW, which is 30% of the recovered heat quantity 35 MW, and the output of the conventional Kalina-cycle is 12.6 MW, which is 120% of the output of the Rankine cycle, the generator-end output 18.1 MW of the combined-cycle power generation system according to the present invention is as high as 172% of the output of the conventional steam turbine system and 144% of the output of the Kalina-cycle.

(2) Even if the waste exhaust gas is a high-temperature corrosive gas and the high-temperature gas and the working fluid of the closed-cycle gas turbine leak owing to corrosion of a heat exchanger, because the pressure in the closed-cycle gas turbine is relatively low (below 2 MPa.abs), there will be no danger as occurs when the high-pressure steam (102 MPa.abs) in the conventional high-temperature and high-pressure Rankine cycle blows out. Moreover, the conventional Kalina-cycle uses ammonia and hence costs a great deal to take countermeasures against blowout accidents when the steam temperature is to be raised to 300° C. or more and the pressure is to be increased to a high level, whereas the combined-cycle power generation system according to the present invention enables the cost of taking safety measures to be favorably reduced.

(3) The gas turbine cycle can be run without externally supplying a fuel, e.g. natural gas. Moreover, because the gas turbine cycle is a closed cycle, there is no need of a filter for taking in the outside air. In an open-cycle gas turbine, the dust component of the outside air adheres to the gas turbine compressor blades, causing the efficiency to reduce. In the present invention, however, the degradation in performance of the gas turbine cycle is minimized because a closed cycle is employed.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. A combined-cycle power generation system using waste matter as a fuel, comprising:

a waste exhaust gas source;

a closed-cycle gas turbine;

a Kalina-cycle steam turbine;

an externally-heated heat exchanger for said closed-cycle gas turbine, said heat exchanger being disposed on a high-temperature side of said waste exhaust gas source;

a heat exchanger for heating a mixed ammonia-water fluid for said Kalina-cycle steam turbine by a high-temperature side exhaust gas from said closed-cycle gas turbine;

a heat exchanger for evaporating a condensate of said mixed ammonia-water fluid by heat remaining in the exhaust gas from said closed-cycle gas turbine; and an externally-heated heat exchanger for said Kalina-cycle steam turbine, said heat exchanger being disposed on a low-temperature side of said waste exhaust gas source to evaporate said mixed ammonia-water fluid by heat remaining in the waste exhaust gas.

2. A combined-cycle power generation system according to claim 1, wherein said externally-heated heat exchanger for said closed-cycle gas turbine is a ceramic heat exchanger.

3. A combined-cycle power generation system using waste matter as a fuel, comprising:

a waste exhaust gas source;

a ceramic heat exchanger disposed on a high-temperature side of said waste exhaust gas source;

a carbon steel heat exchanger disposed on a low-temperature side of said waste exhaust gas source;

a closed-cycle gas turbine;

a Kalina-cycle steam turbine;

a first heat exchanger;

a second heat exchanger disposed downstream said first heat exchanger; and a third heat exchanger disposed between said first heat exchanger and said second heat exchanger;

wherein a working fluid for said closed-cycle gas turbine is pressurized in a compressor for said closed-cycle gas turbine and introduced into said ceramic heat exchanger where it is heated, and said heated working fluid is expanded through said closed-cycle gas turbine to obtain power, and wherein the working fluid discharged from said closed-cycle gas turbine is passed successively through said first heat exchanger, said third heat exchanger, and said second heat exchanger and introduced into said compressor, and wherein a mixed ammonia-water fluid, which is a working fluid for said Kalina-cycle steam turbine, is heated in said first heat exchanger, and said heated mixed ammonia-water fluid is expanded through said Kalina-cycle steam turbine to obtain power, and wherein said mixed ammonia-water fluid is distilled, cooled and condensed in a Kalina-cycle distillation and condensation system for adjusting a concentration of said mixed ammonia-water fluid, and said mixed ammonia-water fluid thus distilled, cooled and condensed is introduced into said second heat exchanger where it is heated by heat retaining in the working fluid for said closed-cycle gas turbine, and wherein a part of said heated mixed ammonia-water fluid is introduced into said carbon steel heat exchanger where it is heated to within an allowable temperature for carbon steel relative to a corrosive gas, while the remaining mixed ammonia-water fluid is introduced into said third heat exchanger where it is heated, and the heated mixed ammonia-water fluid is joined with the mixed ammonia-water fluid heated in said carbon steel heat exchanger and introduced together into said first heat exchanger.

* * * * *